269-58. OR RE13,449 EX
T. C. BRASKETT.
CHEESE CUTTER.
APPLICATION FILED SEPT. 24, 1906.
Reissued July 30, 1912.
13,449.
2 SHEETS—SHEET 1.
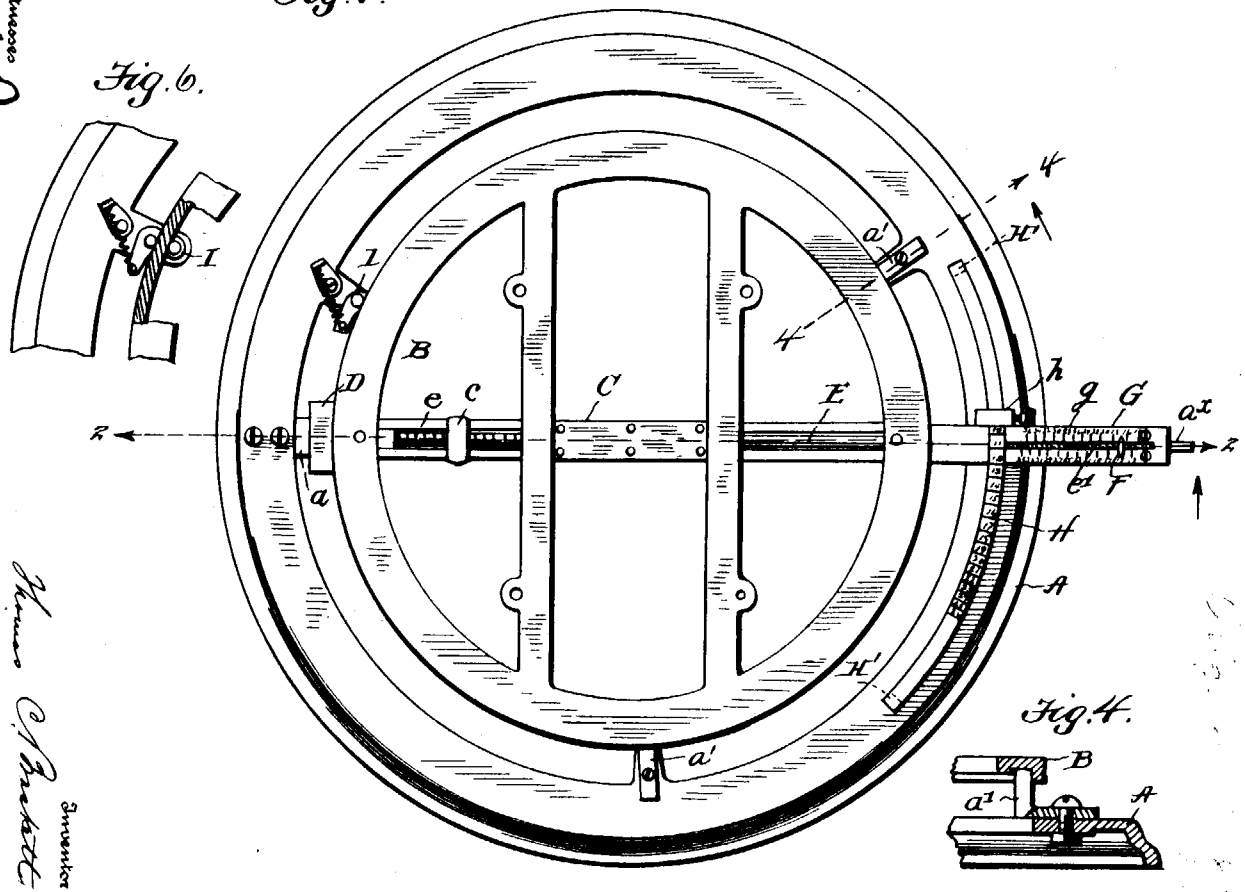
Witnesses
R. T. Brooks
R. W. Bishop
Inventor
Thomas C. Braskett
By Davis & Davis,
Attorneys.

1.-DAIRY.
15
T. C. BRASKETT.
CHEESE CUTTER.
APPLICATION FILED SEPT. 24, 1906.
Reissued July 30, 1912.
13,449.
2 SHEETS—SHEET 2.
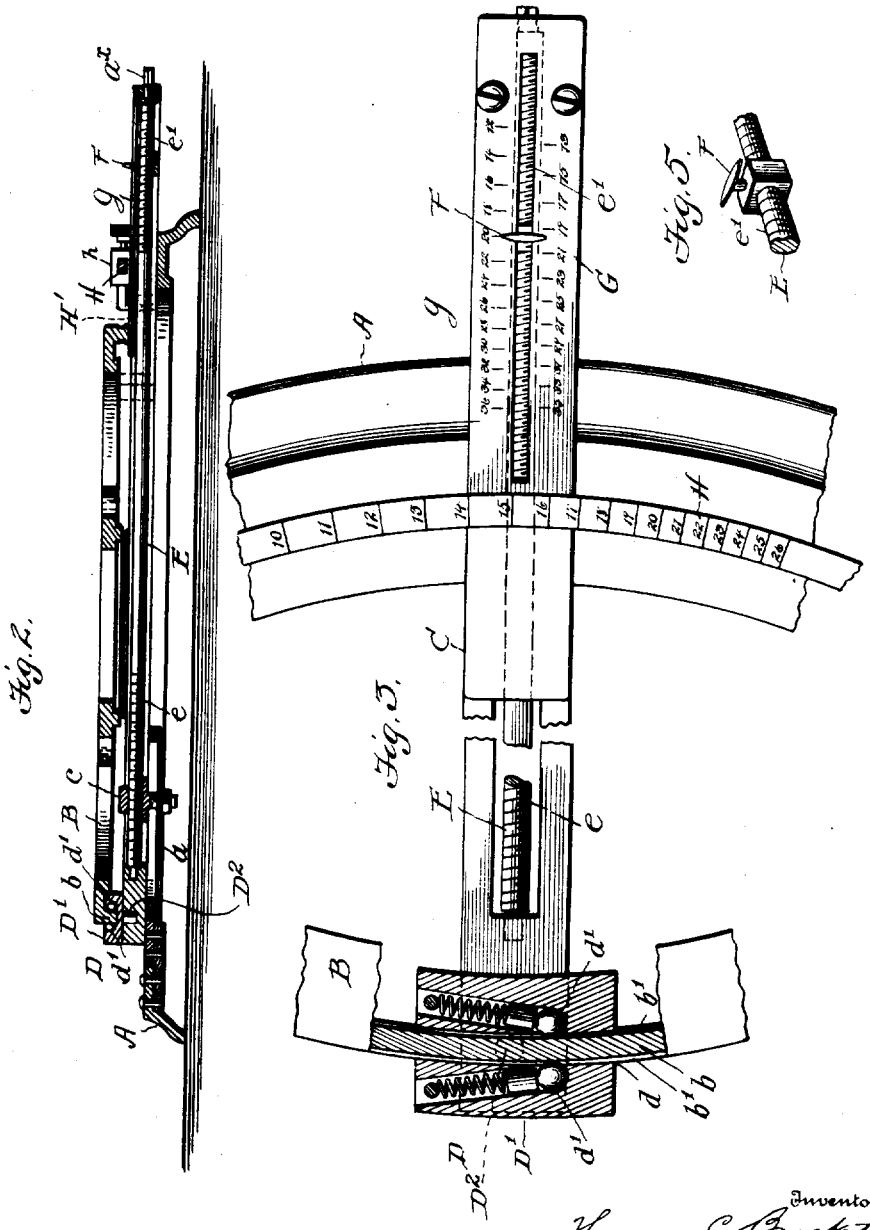
Witnesses
R. J. Brooks
R. W. Bishop
Inventor
Thomas C. Braskett
By Davis & Davis
Attorneys.
COLUMBIA PLANOGRAPH CO., WASHINGTON, D. C.

UNITED STATES PATENT OFFICE.

THOMAS C. BRASKETT, OF ANDERSON, INDIANA, ASSIGNOR, BY MESNE ASSIGNMENTS, TO THE ANDERSON COMPUTING SCALE COMPANY, OF ANDERSON, INDIANA, A CORPORATION OF INDIANA.

CHEESE-CUTTER.

13,449. Specification of Reissued Letters Patent. Reissued July 30, 1912.

Original No. 807,999, dated December 19, 1905, Serial No. 199,416. Application for reissue filed September 24, 1906. Serial No. 336,065.

*To all whom it may concern:*

Be it known that I, THOMAS C. BRASKETT, a citizen of the United States, and a resident of Anderson, in the county of Madison and State of Indiana, have made a certain new and useful Invention in Cheese-Cutters; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a plan view of my invention as applied. Fig. 2 is a section on the line 2—2, Fig. 1. Fig. 3 is a detail view on a larger scale, showing the scale G in plan view and clutch D in horizontal section. Fig. 4 is a detail view of supports $a'$. Fig. 5 is a detail view of indicator F. Fig. 6 is a detail view of pawl device I.

The invention has relation to cheese-cutters, and has for its object the provision of simple and efficient means for regulating the throw of the table-rotating lever in accordance with different weights of cheese and in connection therewith means for regulating such throw in accordance with different prices per pound.

With these objects in view the invention consists in the novel construction and combinations of parts, as hereinafter set forth.

Referring to the accompanying drawings, the letter A designates a suitable base having a radial slotted inner extension or arm $a$, and B is the cheese-table inclosing and resting upon supports $a'$ of the base and having a depending ring-flange $b$. C is the lever for rotating said table, said lever extending across the base underneath the table and having a movable fulcrum connection $c$ with the slot of arm $a$ and a clutch connection with depending ring-flange $b$ at one side of the cheese-table at D. This lever is provided with a rotatable rod E, extending longitudinally thereof and turning in suitable bearings at the end portions of the lever. Opposite end portions of the rod E are screw-threaded at $e$ $e'$ the fulcrum connection $c$ engaging the thread $e$ at the rear end of said rod and upon rotation of the rod moving up or down the thread to increase or decrease the throw of the rear end of the lever which carries the clutch.

F is an indicator engaging the threaded forward end $e'$ of the rod E and having movement up or down said thread upon turning said rod, said indicator working in connection with a scale G upon plate $g$ at the handle or forward end of the lever. The scale G is graduated from "12" to "36," inclusive, for the total cheese weights, and runs longitudinally of the lever.

The clutch D consists of a head D′, pivoted at $D^2$, Fig. 2, to the rear end of the lever C, said head having an arcuate slot $d$ therein, in which fits depending ring-flange $b$ of the cheese-table. This head is bored out at opposite sides of said groove to receive the spring-pressed balls $d'$, which project through openings connecting the bores and slot $d$ into engagement with opposite sides of flange $b$, said flange having shallow grooves $b'$ to receive the balls.

H is an arcuate guide and scale-plate extending over and transversely across the handle end of lever C, which works therein. This scale-plate is graduated upon its upper face from "10" to "26," inclusive, for prices per pound in cents. An adjustable stop $h$ limits the movement of the lever with relation to this scale.

A clutch device I is employed to keep the cheese-table from turning backwardly upon the non-working stroke of the lever.

In the operation of my invention the cheese is first weighed, being then placed upon the table B and the rod E turned forward or backward by means of a wrench or key applied to its squared end $a^x$ until the indicator F registers with the proper cheese weight upon scale G. At the same time said rod is turned the fulcrum connection $c$ will be adjusted nearer to or farther away from the rear end of the lever, according as the cheese weight is greater or smaller, to decrease or increase the throw of the clutch-carrying arm of the lever, and thus decrease or increase the movement of the cheese-table and cheese thereon. It will be understood that the length of the curved bar H is so proportioned to the total-weight scale on the lever that one full throw of the lever measures off one pound of cheese after the total-weight scale is adjusted, the ends of the bar being turned down at H′ to form permanent stops that determine the maximum throw of the lever. When it is desired to measure off a quantity of cheese by money value, the price-unit scale on guard-rod H is employed. This bar is provided with graduation-marks that indicate the throw of the lever required to measure off five cents' worth of cheese, having the various total weights indicated on the total-weight scale. When stop *h* is set in the position shown in Fig. 1, one throw of the lever will measure off five cents' worth at ten cents per pound, and of course additional throws of the lever may be made if more than five cents' worth is desired. When it is not desired to use this price-scale, the stop *h* may be slid along the bar until it comes against one of the end stops H′.

Having thus described my invention, what I claim as new, and desire to secure by Letters Patent, is—

1. In a cheese-cutter, the combination of a rotary cheese-table, an operating-lever for the same having a scale, a movable fulcrum for said lever, an indicator, and means carried by said lever for changing the position of said fulcrum in accordance with the adjustment of said indicator, substantially as specified.

2. In a cheese-cutter, the combination of a rotary cheese-table, an operating-lever for the same having a cheese-weight scale upon said lever, an indicator for said scale, a movable fulcrum for said lever, and means for simultaneously adjusting said indicator and movable fulcrum, substantially as specified.

3. In a cheese-cutter, the combination of a rotary cheese-table, a horizontally-working operating-lever for the same, a price-per-unit scale-bar extending transversely of said lever and an adjustable stop upon said scale-bar, substantially as specified.

4. In a cheese-cutter, the combination of a rotary cheese-table, an operating-lever for the same having a longitudinal cheese-weight scale, a movable fulcrum for said lever, an indicator, means for simultaneously adjusting said indicator and fulcrum, a transverse price-per-unit scale, and an adjustable stop therefor, substantially as specified.

5. A cheese-cutter, having in combination a rotary cheese-table, an operating-lever for the same having a cheese-weight scale upon said lever, an indicator for said scale, a movable fulcrum for said lever, and a longitudinal adjusting-rod engaging said fulcrum and indicator, substantially as specified.

6. A cheese-cutter having in combination a rotary cheese-table, an operating-lever therefor having a scale, a clutch for engagement with said table at the rear end of said lever, an indicator for said scale, a movable fulcrum intermediate of the ends of the lever, and means for simultaneously adjusting said fulcrum and indicator, substantially as specified.

7. In a cheese-cutter, the combination of a rotary cheese-table, an operating-lever therefor having a cheese-weight scale at its forward end, an indicator therefor, a price-per-unit scale-bar at the forward end of said lever, an adjustable stop for said price-per-unit scale-bar, and means for varying the amount of movement imparted by said lever to the cheese-table upon adjustment of said cheese-weight indicator, substantially as specified.

8. In a cheese-cutter, the combination of a rotary cheese-plate, a lever for rotating the plate, a clutch between the plate and lever, an adjustable fulcrum, and means carried by the lever for adjusting the fulcrum, substantially as specified.

9. In a cheese-cutter, the combination of a base-frame and a rotary table mounted thereon, a vibrating lever and means actuated thereby for rotating the table varying measured distances, and means mounted on the vibrating lever for varying the distance the table may be thrown by the lever with a stroke of a given length.

10. In a cheese-cutter, the combination of a base-frame, and a rotary table mounted thereon, a vibrating lever having a fixed maximum throw, means actuated thereby for rotating the table variable distances in accordance with the amount of cheese to be measured off, a total-weight scale on said lever, an indicator working in conjunction therewith, and means carried by the lever for moving the indicator simultaneously with the adjustment of the table-throwing devices.

11. In a cheese-cutter, the combination of a base-frame and a rotary table mounted thereon, a clutch adapted to rotate the table variable distances, a vibratable lever connected to the clutch and pivoted to the base and having a handle portion projecting beyond the table, a total-weight scale on the projecting end of the lever, a screw-rod carried by the lever, an indicator actuated by this rod and means whereby the turning of this rod varies the throw of the clutch-carrying arm, the variation in throw being indicated by the scale on the lever.

12. In a device for cutting cheese and the like into portions, a cheese-support, a lever for feeding the cheese, a variable fulcrum therefor, two scales, one a price-per-pound scale and the other a scale for indicating the various weights of cheeses, means whereby one of said scales controls the position of said fulcrum and means whereby the other scale controls the movement of the lever so that cheeses of varying weights

AIRY.

5 and prices per pound may be cut into measured portions for the purpose set forth.

13. In a device for cutting cheese and the like into portions, a cheese-support, a lever for feeding the cheese, a variable fulcrum for said lever, and a plurality of scales, one of which indicates the desired adjustment of said fulcrum and the other of which indicates desired movement of lever to cut by value.

14. In a computing cheese-cutter, the combination of a base and a rotary cheese-table thereon, a lever for operating the same, a price unit scale-bar extending transversely of said lever, and an adjustable stop upon said scale bar, for the purpose set forth.

15. In a computing cheese-cutter, the combination of a base, a rotary cheese-table, an operating lever for the same, a cheese weight scale and means coöperating therewith for varying the influence of the lever upon the cheese-table, a transverse price scale, and an adjustable stop therefor, for the purpose set forth.

16. In a computing cheese-cutter, the combination of a base and a rotary table thereon, a vibrating lever, a clutch operated by the lever to throw the table variable distances, and means carried by the lever for varying the throw of the clutch without varying the throw of the handle end of the lever.

17. In a computing cheese-cutter, the combination of a rotary cheese-table, and means for rotating the table controlled by a price scale and a total-weight scale, whereby the cheese may be cut by weight or by value.

18. In a computing cheese cutter, the combination of a base, a rotary table, devices for rotating the table embodying a lever, and controlling means embodying a scale on the base and a scale on the lever, one of said scales being a weight scale and the other a price scale.

In testimony whereof I affix my signature in the presence of two witnesses.

THOMAS C. BRASKETT.

Witnesses:

WILLIAM C. FOSS,
JESSIE PEDEU.

Copies of this patent may be obtained for five cents each, by addressing the "Commissioner of Patents, Washington, D. C."